(12) United States Patent
Wolff (10) Patent No.: US 11,080,989 B2
(45) Date of Patent: Aug. 3, 2021

(54) METHOD FOR ASSIGNING A SMOKE DETECTOR TO BE REGISTERED AND A CORRESPONDING SMOKE DETECTOR MANAGEMENT SYSTEM

(71) Applicant: Lupus-Electronics GmbH, Landau (DE)

(72) Inventor: Matthias Wolff, Berlin (DE)

(73) Assignee: Lupus-Electronics GmbH

(*) Notice: Subject to any disclaimer, the term of this patent is extended or adjusted under 35 U.S.C. 154(b) by 0 days.

(21) Appl. No.: 16/918,506

(22) Filed: Jul. 1, 2020

(65) Prior Publication Data

US 2021/0056834 A1 Feb. 25, 2021

(30) Foreign Application Priority Data

Aug. 21, 2019 (DE) .......................... 102019122514.0

(51) Int. Cl.
| | | |
|---|---|---|
| *G08B 29/04* | (2006.01) | |
| *H04W 76/11* | (2018.01) | |
| *G08B 17/10* | (2006.01) | |
| *H04L 29/08* | (2006.01) | |
| *G16Y 40/10* | (2020.01) | |
| *G16Y 40/50* | (2020.01) | |

(52) U.S. Cl.
CPC ........... *G08B 29/043* (2013.01); *G08B 17/10* (2013.01); *H04L 67/12* (2013.01); *H04L 67/306* (2013.01); *H04W 76/11* (2018.02); *G16Y 40/10* (2020.01); *G16Y 40/50* (2020.01)

(58) Field of Classification Search
CPC ..... G08B 29/043; G08B 17/10; H04W 76/11; H04L 67/12; H04L 67/306

USPC ......................................... 340/506, 577, 628
See application file for complete search history.

(56) References Cited

U.S. PATENT DOCUMENTS

| 10,078,828 B2* | 9/2018 | Kakino ..................... G06K 9/78 |
|---|---|---|
| 10,114,351 B2* | 10/2018 | Fadell ................. H04L 12/2823 |
| 2002/0126016 A1* | 9/2002 | Sipp ....................... G08B 17/10 |
| | | 340/628 |

FOREIGN PATENT DOCUMENTS

| DE | 102014014106 A1 | 3/2016 |
|---|---|---|
| EP | 3447744 A1 | 2/2019 |

* cited by examiner

*Primary Examiner* — Kerri L McNally
(74) *Attorney, Agent, or Firm* — Harness, Dickey & Pierce, P.L.C.

(57) ABSTRACT

A method for assigning a smoke detector (2) to be registered to a user profile (11) of a smoke detector management system (1), comprising the steps: establishing a data connection between the smoke detector (2) and a server (3) and transmitting first identification data (6) of the smoke detector (2) to the server (3); establishing a data connection between a mobile device (4) and the server (3); logging into the user profile (11) by means of the mobile device (4) using the user identification data (5); transmitting second identification data (7) of the smoke detector (2) to be registered to the mobile device (4); transmitting the second identification data (7) and/or the user identification data (5) to the server (3) by means of the mobile device (4); and identifying the smoke detector (2) by means of the first and/or second identification data (6; 7) and assigning the smoke detector (2) to the logged in user profile (11) or the user profile (11) corresponding to the user identification data (5).

16 Claims, 6 Drawing Sheets

| LUPUS ELECTRONICS | | | | | John Smith |
|---|---|---|---|---|---|
| Company account > | | | | | |
| 1659 sensors | ● Active 75% | ● Warnings 3% | ● Faulty 21% | | + ADD A BUILDING IN THIS LOCATION |
| View as Files \| List | | ↓ DOWNLOAD ALL REPORTS | | | |
| ☐ Company ∨ | ⊙ Device ID ▼ | Company ∨ | ⋅ıl Status ∨ | ☐ Battery life ∨ | ⊙ Location ∨ |
| | 213129210 | Endava | ○ Active | 100% | Cluj-Napoca |
| | 213129210 | Endava | ○ Active | 100% | Cluj-Napoca |
| | 213129210 | Lupus electronics | ○ Active | 100% | Cluj-Napoca |
| | 213129210 | Lupus electronics | ○ Warning | 35% | Cluj-Napoca |
| | 213129210 | Lupus electronics | ○ Faulty | 100% | Bucharest |
| | 213129210 | Endava | ○ Active | 100% | Bucharest |
| | 213129210 | Endava | ○ Active | 100% | Bucharest |
| | 213129210 | Endava | ○ Active | 100% | Bucharest |
| | | | Rows per page 20 ∨ | 1-20 of 100 | I< < > >I |

Fig. 6

LUPUS ELECTRONICS

243 Notifications

John Smith

11 — Notification setting

FILTER | SELECT ALL | MARK AS READ | DELETE SELECTED

June 4 2019
3 Notifications

- ☐ 21:04  A new device with ID 2132121 was added in your United Business center building, Cluj-Napoca
- ☐ 21:02  A new device with ID 213210 was added in your United Business center building, Cluj-Napoca
- ☐ 21:00  Low battery for device id 2122112 from United Business Center Cluj-Napoca June 3 2019
4.5 Notifications

- ☐ 21:04  A new device with ID 2132121 was added in your United Business center building, Cluj-Napoca
- ☐ 21:04  A new device with ID 2132121 was added in your United Business center building, Cluj-Napoca
- ☐ 21:04  A new device with ID 2132121 was added in your United Business center building, Cluj-Napoca
- ☐ 21:02  Fire alarm at the United Business Center Room 2 Floor 5
- ☐ 21:04  A new device with ID 2132121 was added in your United Business center building, Cluj-Napoca
- ☐ 21:04  A new device with ID 2132121 was added in your United Business center building, Cluj-Napoca

12

METHOD FOR ASSIGNING A SMOKE DETECTOR TO BE REGISTERED AND A CORRESPONDING SMOKE DETECTOR MANAGEMENT SYSTEM

CROSS-REFERENCE TO RELATED APPLICATIONS

This application claims the benefit and priority of German Application No. 102019122514.0 filed Aug. 21, 2019. The entire disclosure of the above application is incorporated herein by reference.

FIELD

The invention relates to a method for assigning a smoke detector to be registered and a corresponding smoke detector management system.

BACKGROUND

The installation of smoke detectors is legally required in many places. As a rule, maintenance and inspection of installed smoke detectors every 12 months is provided for in order to ensure that they function properly in case of an alarm. However, a conventional on-site inspection is time and cost intensive. Remote maintenance is therefore desirable, e.g. checking the functional capability, for example by means of a suitable smoke detector management system, so that the on-site inspection only has to be carried out if the smoke detector actually fails, or if the smoke detector is replaced.

However, this requires a safe and reliable registration or allocation of the smoke detectors to the respective users or user profiles of the smoke detector management system. For example, it must be avoided, that the respective smoke detector is assigned to the wrong user or user profile, because otherwise an indication of a necessary smoke detector replacement cannot be delivered correctly or a smoke detector cannot be recognized to be defective.

A method for linking a smoke detector to a user of a smoke detector management system is known from DE 10 2014 014 106 A1. According to this reference, the smoke detector is assigned to the user by the user sending several confirmation data to the smoke detector management system via operating elements attached to the smoke detector at a time interval specified by the smoke detector management system; the assignment is thus carried out by the user pressing an operating element, e.g. a button, of the smoke detector several times at the right moment.

This can lead to problems when several smoke detectors are registered simultaneously by several users, if, for example, one of the users unintentionally activates the time sequence actually assigned to another user or smoke detector. In addition, a successful assignment of the smoke detector depends on the "tact" of the user, so that several failed attempts can result.

A further method for assigning a smoke detector to a smoke detector management system with a server using a mobile device is known from EP 3 447 744 A1. Here, a first code is transmitted from the server to the mobile device connected to the server. A second code of the smoke detector is provided to the mobile device, for example by reading and typing it into the mobile device or by scanning a QR code. The smoke detector provides a Wi-Fi access point that connects the smoke detector to the mobile device, with access authenticated by the second code. The mobile device then transmits the network identity of a Wi-Fi home network to the smoke detector, so that the smoke detector is then connected to the Internet and the server via the Wi-Fi home network. Once the first code has been transmitted from the smoke detector to the server, the assignment of the smoke detector to the smoke detector management system can be completed.

It is therefore an aspect of the present invention to provide a method for the allocation of a smoke detector to be registered to a user profile of a smoke detector management system, which realizes a safe, reliable and simple allocation.

Accordingly, a method for assigning a smoke detector to be registered to a user profile of a smoke detector management system is described. The method comprises the following steps:

establishing a data connection between the smoke detector and a server of the smoke detector management system and transmitting first identification data of the smoke detector to be registered to the server;

establishing a data connection between a mobile device and the server;

logging into the user profile by means of the mobile device using user identification data uniquely assigned to the user profile;

transmitting second identification data of the smoke detector to be registered to the mobile device;

transmitting the second identification data and/or the user identification data to the server by the mobile device; and identifying the smoke detector using the first and/or second identification data and assigning the smoke detector to the logged in user profile or to the user profile corresponding to the user identification data.

The method according to the preferred embodiment of the invention is characterized in particular by the fact that logging into the user profile by means of the mobile device takes place using the user identification data and second identification data are transmitted from the smoke detector to the mobile device. After transmission of the second identification data by the mobile device to the server, the server can thus clearly assign the smoke detector to the logged in user profile. The server can have at least one communication interface for data exchange with the at least one smoke detector and the at least one mobile device. The smoke detector and the mobile device can have suitable communication interfaces for mutual data exchange and/or for data exchange with the server. The smoke detector management system and/or the server of the smoke detector management system may preferably be cloud-based. This can result in a particularly advantageous scalability of the smoke detector management system.

After identifying the smoke detector and assigning the smoke detector to the user profile, position and/or address data can be assigned to the smoke detector assigned to the user profile. For the acquisition of position data, the smoke detector can have a GNSS module, for example. As address data, for example, a country, a city, a street address, a building number, a floor number, a room number or the like and/or any combination of these can be assigned to the smoke detector. The position and/or address data can be stored on the server. However, it may also be provided that the smoke detector has a data memory for storing the respective data. If position and/or address data are assigned to the smoke detector, they can be accessed and/or changed via the user profile. It may be provided that after the smoke detector has been assigned to a user profile, the respective position and/or address data is stored on the server and/or the smoke detector and then assigned to the smoke detector.

However, it can also be provided that the respective position and/or address data are already stored on the server and/or the smoke detector before the smoke detector is identified and are assigned to the smoke detector after the smoke detector has been identified. It may be provided that the depositing of the position and/or address data for several smoke detectors is not carried out one after the other, but essentially in parallel, for example by means of a suitable hierarchical data format or a list. Especially if several smoke detectors are to be assigned to one user profile, this can result in a flexible and convenient assignment of the position and/or address data, since the smoke detectors only have to be linked to the data already stored and the separate storage of individual data records for each individual smoke detector can be dispensed with. Likewise, the installation of several smoke detectors can be made easier in that their installation position and/or address is already fixed before they are attached. The assignment of address data to the smoke detectors is particularly advantageous, as this allows the smoke detectors to be divided into meaningful groups in a particularly convenient way. For example, several smoke detectors can be assigned to the same street address and the same building, but differ in room number.

It may be planned to carry out some of the steps of the method in different order. For example, the second identification data of the smoke detector to be registered can first be transmitted to the mobile device and/or the second identification data and/or the user identification data can be transmitted to the server of the smoke detector management system by the mobile device before the first identification data of the smoke detector are transmitted to the server of the smoke detector management system.

The smoke detector can detect smoke by measuring the concentration of suitable smoke components or combustion gases, for example carbon monoxide, by temperature measurement and/or optically and trigger an alarm. The smoke detector can have an acoustic signal transmitter, e.g. a siren or a loudspeaker, to trigger the alarm. However, it is also conceivable that the alarm can be triggered additionally or instead optically, e.g. by LEDs. The smoke detector may have a GNSS module for determining location or position or for determining position data. The smoke detector may have further sensors for environment monitoring, e.g. one or more ultrasonic sensors and/or sensors for monitoring a smoke entry chamber of the smoke detector, e.g. one or more infrared diodes and/or infrared sensors. If the smoke detector has such sensors, objects in the vicinity of the smoke detector or contamination of the smoke chamber by dust, for example, can be detected. In this way, impairments to the measuring accuracy of the smoke detector, up to and including a failure, can be detected at an early stage. The smoke detector can have a sabotage contact, e.g. to detect a release from a mounting bracket of the smoke detector.

Preferably the smoke detector management system and/or the server is cloud-based. This allows for good scalability. The mobile device can be a smartphone, a laptop, a PDA or a tablet. The user identification data can include a user name, a pin, an alphanumeric code, an e-mail address, an electronic fingerprint or fingerprint, an electronic signature and/or a photo. The first and/or second smoke detector identification data may include information regarding the smoke detector type or manufacturer, location, address or position data of the smoke detector and/or an alphanumeric code uniquely assigned to the smoke detector. Establishing a connection of the smoke detector to be registered with the server of the smoke detector management system and transmitting the first identification data can be done, for example, by pressing a button attached to the smoke detector. However, it may also be provided that the transmission of the first identification data from the smoke detector to the server by the smoke detector takes place automatically after establishing a connection to the server.

Logging in can take place via a computer program, an app or a GUI provided on the mobile device. After logging in, for example, a user can inform the server that a smoke detector is to be added to the logged in user profile. If a computer program, app or GUI is used for logging in, the second identification data can be transmitted to the server by the computer program, app or GUI. In one embodiment, the transmission of the first identification data to the server can take place after establishing a connection between the smoke detector and the mobile device. It may be provided that in this case the transmission of the first identification data is done by the computer program, app or GUI, i.e. the transmission of the first identification data is initiated by the mobile device, for example by transmitting a corresponding instruction to the smoke detector or the server.

It may be provided that the first and the second identification data are identical. This makes it easier to assign the smoke detector to the logged in user profile, since a comparison of the first and second identification data or a check for mutual correspondence can be omitted.

The smoke detector and/or the mobile device can be connected to the server wirelessly at least during the transmission of the respective data, preferably via a mobile radio network, especially preferably via Narrowband IoT. The smoke detector may have a suitable module, for example a SIM card. It may be provided that both the smoke detector and the mobile device are connected to the server in the same way, e.g. both via Narrowband IoT. This ensures that only the selected network must be available for registering the smoke detector, whereas two networks must be available for different connection types.

The smoke detector can either be connected directly to the server or to the server via the mobile device when establishing the connection to the server.

In particular, if the smoke detector is connected directly to the server, no additional gateway is required. However, it can also be provided that the mobile device acts, for example, as a gateway between smoke detector and server during the registration process. In both cases it can be ensured that the mounting location of the smoke detector does not have to be within the receiving and transmitting range of another gateway. In this way, the installation and assignment of the smoke detector to be registered can be made easier. A connection of the smoke detector to the server via the mobile device can be particularly advantageous if the smoke detector and the mobile device are connected to the server in different ways. If, for example, the smoke detector is connected to the server via Narrowband IoT and the mobile device via a GSM network, the smoke detector can be registered by the mobile device via the GSM network. After registration, the smoke detector can communicate with the server via Narrowband IoT and, for example, transmit measurement data or be serviced.

The transmission of the second identification data to the mobile device either comprises the recording of a QR code attached to the smoke detector with the mobile device, or the detection by the mobile device of a pictogram or alphanumeric code placed on or attached to the smoke detector and the use of image recognition software, or it can be carried out via a wireless connection between the smoke detector and the mobile device.

If a computer program, app or GUI is used to log in, the computer program, app or GUI may, for example, request the user to scan a QR code on the smoke detector or to enter an alphanumeric code after logging in and/or notifying the server of the user's intention to register. It may also be provided that the mobile device automatically detects the smoke detector if it is in sufficient proximity. The smoke detector and/or the mobile device may be set up in such a way that automatic transmission of the second identification data takes place. It may be provided that the user must confirm the second identification data recorded by the mobile device.

Before assigning the smoke detector, an authorisation request can be sent from the server to the mobile device. If a computer program, app or GUI is used for logging in, this authorization request can be communicated to the user by the computer program, app or GUI. It may be provided that the registration or assignment of the smoke detector to the user profile can only take place or be completed when the user confirms the authorization request.

After the smoke detector has been assigned to a user profile, the smoke detector can be assigned to at least one further user profile, whereby this further assignment is carried out either analogously to the method described above or by changing the assignment data stored on the server.

If a change of the allocation data stored on the server of the smoke detector management system is to be made, it can be provided, for example, that the user whose user profile the smoke detector has been allocated to logs in and, for example, allocates a further user profile to the smoke detector allocated to him via the computer program, the app or the GUI or releases this to a further user profile. It may be planned to assign the assigned smoke detector to a smoke detector group and/or smoke detector subgroup after the assignment to a user profile. After the assignment to a smoke detector group and/or smoke detector subgroup, it can be intended to allow other user profiles at least partial access to the data transmitted from the smoke detector to the server. It may also be intended to change the operating parameters and/or settings of assigned smoke detectors via the mobile device after assignment to a user profile.

The smoke detector can periodically transmit status data and/or operating data and/or the first identification data and/or the second identification data to the server after assignment. The status data can include, for example, status messages of the smoke detector, for example, whether it is active or an alarm is present, which firmware is loaded or a sensor status or possibly battery status. If, for example, there is an object in the vicinity of the smoke detector or if such an object is placed nearby, the smoke detector can detect this via an environment sensor and communicate to the server. The evaluation of the status data can be done on the server and/or smoke detector side. If the evaluation is carried out on the smoke detector side, the smoke detector has a suitable evaluation unit, for example a microcontroller or similar. The operating data can include, for example, measurement data measured by the smoke detector sensors. The operating data may, for example, include temperature data or measured values of the concentration of suitable smoke indicators. The data transmitted to the server can be stored on the server in such a way that they are accessible to the user profile assigned to the smoke detector. It may be provided that the transmitted data can be accessed by means of the mobile device, preferably by means of the computer program, the app or the GUI. Preferably at least once every 24 hours, especially preferably at least once every 12 hours, the respective data will be transmitted from the smoke detector to the server. In particular, it may be provided that in the event of an alarm, the smoke detector does not wait until the next periodic transmission time, but immediately transmits the respective data to the server.

After allocation the smoke detector can once or periodically compare operating parameters, settings and/or firmware with the server and/or synchronize with it. Operating parameters can, for example, include the periodic transmission intervals. Settings can, for example, include threshold values necessary for the detection of an alarm. The term "adjust" can mean that the smoke detector compares the operating parameters, settings and/or firmware and/or firmware version stored in it with those stored on the server. The term "synchronize" can mean that the smoke detector downloads and/or updates the different values or programs from the server if a difference is detected during or after the adjustment. It can be intended that the smoke detector carries out the adjustment and/or synchronisation independently, i.e. makes corresponding requests to the server. However, it can also be provided that the server queries the respective information from the smoke detector, checks for differences and, if necessary, communicates this to the smoke detector and/or initiates downloading to the smoke detector. Preferably, a comparison and, if necessary, a synchronisation is carried out at least once every 24 hours, especially preferably at least once every 12 hours. It may also be provided that the adjustment and/or synchronisation is initiated by the user after logging in to the user profile.

The invention further relates to a smoke detector management system, comprising at least one smoke detector and at least one server, wherein at least one user profile is stored on the server, wherein the server is connected to the at least one smoke detector for data exchange, wherein the server is preferably cloud-based, wherein the server is set up to store data received from the smoke detector and to make it accessible to a user profile assigned to the smoke detector, wherein the smoke detector is assigned to the user profile by the described method according to the invention.

The smoke detector can be connected to the server wirelessly, preferably via a mobile radio network and particularly preferably via narrowband IoT. Preferably, the smoke detector can be directly connected to the server. This means that there is no need for an additional gateway between the smoke detector and the server.

The server can be connected to at least one computer device for data exchange, whereby the computer device can be adapted to download or manipulate the data received from the corresponding smoke detector and stored on the server using user identification data uniquely identifying the user profile, or to add new data to the user profile or to access the data. The computer device may be a mobile device, for example a laptop, smartphone, PDA or tablet. The computing device may be or include another server, desktop PC, workstation, microcontroller, integrated circuit, FPGA or similar. The computer device may be intended to have a computer program, app or GUI for this purpose. In particular, it may be provided that a user can use it to change or delete the settings and operating parameters stored in his user profile for each smoke detector assigned to the user profile, but can also add new ones. It may also be provided that the computer program, the app or the GUI can graphically prepare and display the data stored on the server by each smoke detector assigned to the user profile. At least one or all computer devices can be connected to the server via the Internet. In one version at least one computer device can be connected to the server by cable.

A plurality of user profiles can be stored on the server, whereby at least one, preferably each of the user profiles can be assigned to at least one of at least two user profile groups, whereby each user profile assigned to the same user profile group can be assigned to the same of the at least one smoke detector. In particular, a smoke detector can thus be assigned to several user profiles and/or user profile groups. In other words, the user profiles assigned to the user profile group can access the same at least one smoke detector. User profiles which are not assigned to the user profile group cannot access the smoke detectors assigned to the user profiles of the user profile groups. In most cases, several user profiles and several smoke detectors are assigned to a user profile group, so that the user profiles of the user profile group can share access to the same at least one smoke detector, for example. However, a user profile group may also include only one user profile with a smoke detector assigned to the user profile. A user profile can be assigned to several user profile groups. If a user profile assigned to one user profile group is assigned to another user profile group, it may be intended to assign the smoke detectors assigned to the user profiles of the other user profile group to the user profile. It is advantageous to divide the user profile groups according to the address data of the smoke detectors. If street addresses and building numbers are assigned to the smoke detectors as address data, then a user profile group can be assigned, for example, those smoke detectors with the same street address and/or the same building number. If a smoke detector is assigned to a user profile of a user profile group, it can be provided that this smoke detector is also automatically assigned to all other user profiles of the user profile group. However, it can also be provided that the user and/or an administrator only further assigns selected user profiles to the smoke detector assigned to him, whereby a further user group consisting of the user profile or administrator and the selected user profiles results.

At least one of the user profiles assigned to a user profile group can have administrator rights at least with regard to the respective user profile group. It may be that only the administrator can add or remove user profiles to a user profile group. It may be provided that only the administrator can manipulate the respective settings and operating parameters of the smoke detectors assigned to the user profiles of the user profile group, or assign or restrict such rights to certain user profiles of the user profile group. It may be provided that the administrator can restrict or allow access of the user profiles assigned to the user profile group to the smoke detectors or the data received from the smoke detectors depending on the user and data set.

Further hierarchy levels with different authorizations and access rights may be provided for each user profile group. In principle, the number of hierarchy levels can be unlimited. It is possible that the classification, promotion or downgrading of the respective user profiles to a certain hierarchy level can only be carried out by user profiles assigned to a higher hierarchy level. Super-administrators or system administrators who have administrator rights for several or even all user profile groups stored on the server may also be provided.

The smoke detector management system can have an evaluation unit that can identify an alarm and/or a maintenance case from the data transmitted by the smoke detector, whereby in the case of an alarm the server can send an alarm message and/or in the case of maintenance a maintenance message to the user profiles assigned to the smoke detector. The alarm message can also be sent from the smoke detector to the server and from the server to the user profiles assigned to the smoke detector. It can also be provided that the alarm message is only sent to the administrator of the respective user profile group assigned to the smoke detector or user profiles determined by the administrator. If the alarm message is sent to a user profile, it can be provided in particular that the alarm message is also sent to computer devices connected to the user profile. The term "alarm case" can preferably refer to a fire and/or smoke event or its detection. Preferably an alarm case can be identified when a threshold value of a temperature or a measured concentration of a suitable smoke component is exceeded. However, in one embodiment, the term "alarm case" may also include the triggering of a sabotage sensor, e.g. in the event of unauthorized removal of the smoke detector from its mounting. It can be provided that an alarm case is present when an object in the vicinity of the smoke detector is detected, e.g. by an ultrasonic sensor of the smoke detector, or when a corresponding threshold value is exceeded. However, it can also be provided that an alarm case occurs when a blockage or soiling of the smoke entry chamber of the smoke detector is detected, for example by dust deposits, or when a corresponding threshold value is exceeded. Preferably, the alarm message is matched to the alarm case. If, for example, address data are stored, the alarm message can contain them. It may be provided that the alarm message at least partially contains the data transmitted by the corresponding smoke detector or communicates them in a suitable manner.

The evaluation unit can evaluate the status of each smoke detector, e.g. by means of the status data transmitted by the smoke detector, and determine whether or to what extent the respective smoke detector requires maintenance or replacement. Alternatively or additionally, the smoke detector management system can also have a separate maintenance evaluation unit for this purpose. If it is determined that the smoke detector requires maintenance or replacement, a maintenance message can be communicated to the user profile assigned to the smoke detector and/or to the administrator or user profiles of the assigned user profile group determined by the administrator. In particular, it may be intended to communicate the maintenance message also to computer devices connected to the user profile. For example, a maintenance message may include a battery change, a failure of one or more sensors of the smoke detector, a replacement of the smoke detector and/or a disconnection between the smoke detector and the server over a period of time. Preferably the maintenance message is tailored to the maintenance case. If, for example, address data are stored, the maintenance message can contain them. It can be provided that the maintenance message contains at least partially the data transmitted by the corresponding smoke detector or communicates them in a suitable way. Furthermore, it may be provided that the evaluation unit and/or, if applicable, the maintenance evaluation unit with the stored status data makes a prediction regarding a maintenance or replacement time. The prediction can be communicated to the user profile assigned to the smoke detector and/or the administrator or user profiles of the assigned user profile group released by the administrator. Preferably the maintenance evaluation unit can be identical with the evaluation unit. In particular, it may be intended to communicate the forecast also to computer devices connected to the user profile.

The evaluation unit and/or maintenance evaluation unit can be designed as software and/or can correspond to or run on the server of the smoke detector management system. However, it may also be provided that the evaluation unit and/or maintenance evaluation unit corresponds to or runs on another computer device connected to the server. It is also conceivable that the evaluation unit and/or maintenance evaluation unit corresponds to or runs on the computer device, i.e. the evaluation is not carried out on the server but locally by the user's devices connected to the server.

DRAWINGS

Further details of the invention are explained with reference to the following figures.

DETAILED DESCRIPTION

Figure 1:
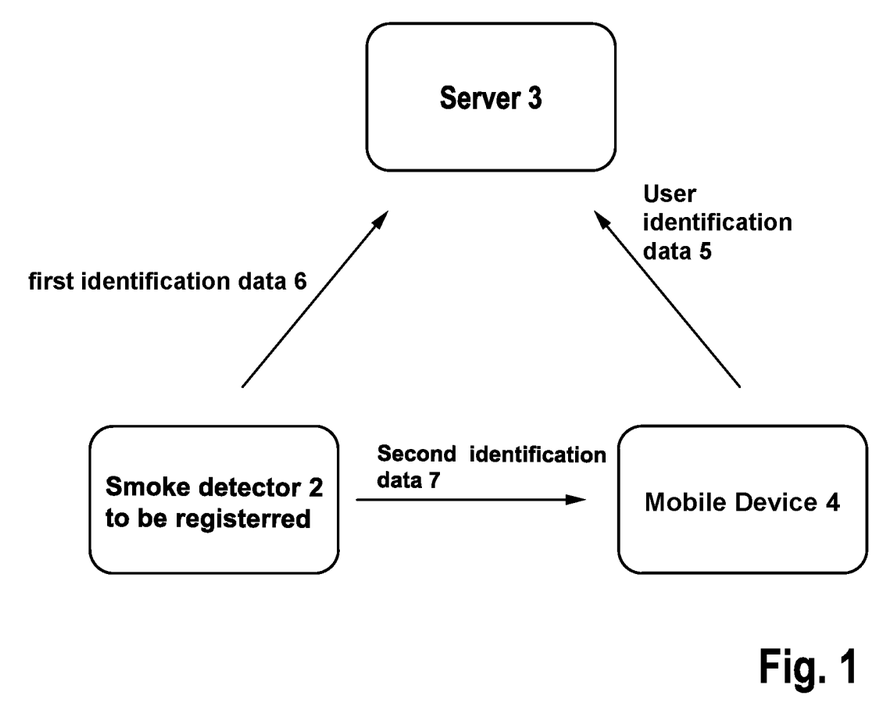
FIG. 1 a schematic representation of an embodiment of a method according to the invention for assigning a smoke detector to be registered.

FIG. 1 schematically shows an embodiment of an inventive method for the registration of a smoke detector 2. The smoke detector 2 to be registered is connected to server 3 of the smoke detector management system 1 in such a way that data can be exchanged between smoke detector 2 to be registered and server 3. The mobile device 4 is connected to server 3 in such a way that data can be exchanged between the mobile device 4 and server 3. Preferably smoke detector 2 and server 3 as well as mobile device 4 and server 3 are connected wirelessly, e.g. via a mobile radio network, especially preferably via narrowband IoT. The smoke detector 2 to be registered transmits the first identification data 6 to Server 3. The connection of smoke detector 2 with Server 3 and the initiation of the transmission of the first identification data 6 can be carried out by a user, for example, through an actuating element of the smoke detector, e.g. a button or an actuating knob. The user can log into his user profile 11 stored on server 3 via an app or GUI stored on the mobile device 4 and inform server 3 via the GUI that a smoke detector 2 is to be added to his user profile 11. Then second identification data 7 is transmitted from the smoke detector 2 to the mobile device 4. The transmission of the second identification data 7 can take place, for example, by scanning a QR code attached to the smoke detector 2 by the mobile device 4. The mobile device 4 can then transmit the second identification data 7 received from the smoke detector 2 and the user identification data 5 uniquely identifying the user profile 11 to the server 3. Server 3 can then identify the smoke detector 2 to be registered, e.g. by comparing the first and second identification data and assigning smoke detector 2 to user profile 11 on the basis of user identification data 5. The now assigned smoke detector 2 can now be displayed e.g. in the GUI and if necessary further configured by the user. For example, address data 17 can now be assigned to smoke detector 2, e.g. a street address or a room number. The address data 17 can already have been stored on server 3 before the smoke detector 2 was assigned to the user profile 11, e.g. also before the data connection between smoke detector 2 and server 3 was established. The address data 17 can also be stored on server 3 by assigning the address data 17 to the smoke detector 2.

It can be provided that the smoke detector 2 checks after its assignment or at periodic intervals whether its installed firmware corresponds to that of the version stored on server 3. In case of deviations, the firmware of the smoke detector can be updated automatically, e.g. by downloading the current version stored on server 3. In the same way, the smoke detector 2 can check after its allocation or at periodic intervals whether its settings or parameters correspond to those of Server 3. If the settings or parameters have been changed on the server side, e.g. by the user via the GUI, the smoke detector 2 can update or synchronise them. It may also be provided that instead of or in addition to the "pull" by the smoke detector 2, server 3 or the user initiates an update of e.g. the firmware or the parameters "push", i.e. on the server side.

After its assignment, the smoke detector 2 can communicate status data or status data and/or operating data or measurement data to server 3 at periodic intervals. It may also be intended to transmit the first and/or second identification data together with the status and/or measurement data in order to enable simple assignment of the data received from server 3 to the respective user profiles 11. The received data can be evaluated on the server side, for example to identify an alarm case and/or a maintenance case.

Figure 2:
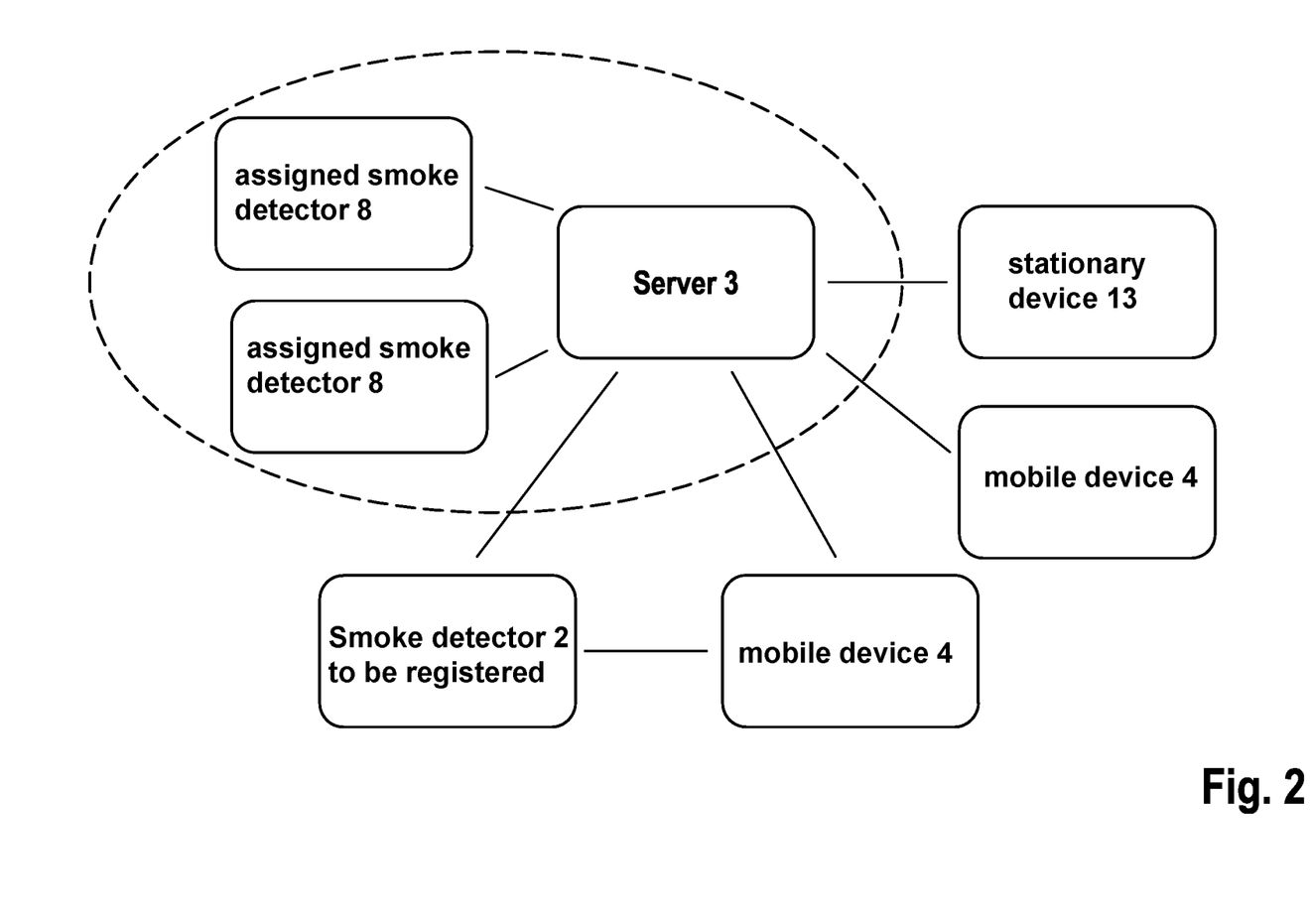
FIG. 2 a schematic representation of an embodiment of an inventive smoke detector management system.

FIG. 2 shows a smoke detector management system 1 with at least one server 3 and at least one assigned smoke detector 8. Smoke detector 8 can exchange data with server 3. For example, Smoke Detector 8 can transmit measurement data or status data to Server 3. Server 3 can send firmware updates to the smoke detector 8, for example. Server 3 is preferably cloud-based. Smoke Detector 8 and Server 3 can preferably be connected via a mobile phone network, e.g. GSM, GPRS, UMTS or LTE, and especially preferably via narrowband IoT. The smoke detector can have a suitable module for this purpose, e.g. a SIM card. This allows the smoke detector to be positioned flexibly, as there is no need to lay cables. The smoke detector 8 is particularly preferred to be connected directly to Server 3. This means that a gateway between the smoke detector 8 and Server 3 can be dispensed with, which further facilitates the installation, replacement and maintenance of the smoke detector 8. In one version, however, at least one of the smoke detectors 8 can also be connected to Server 3 by cable. Furthermore, FIG. 2 shows a smoke detector 2 to be registered and a mobile device 4 used for registration, both of which are connected to server 3 for data exchange in order to carry out the registration method described above. As shown in FIG. 2, another mobile device 4 is connected to server 3. Via mobile device 4 a user can access his user profile 11 stored on server 3 and, for example, retrieve the data stored on server 4 for the smoke detector 8 assigned to user profile 11. A stationary device 13 can also be used for the same purpose, i.e. the user can also access server 3 or his user profile 11 via the stationary device 13. The mobile device 4 can be, for example, a smartphone, a PDA, a tablet or a laptop. The stationary device 13 can be, for example, a desktop PC, a workstation or similar.

Figure 3:
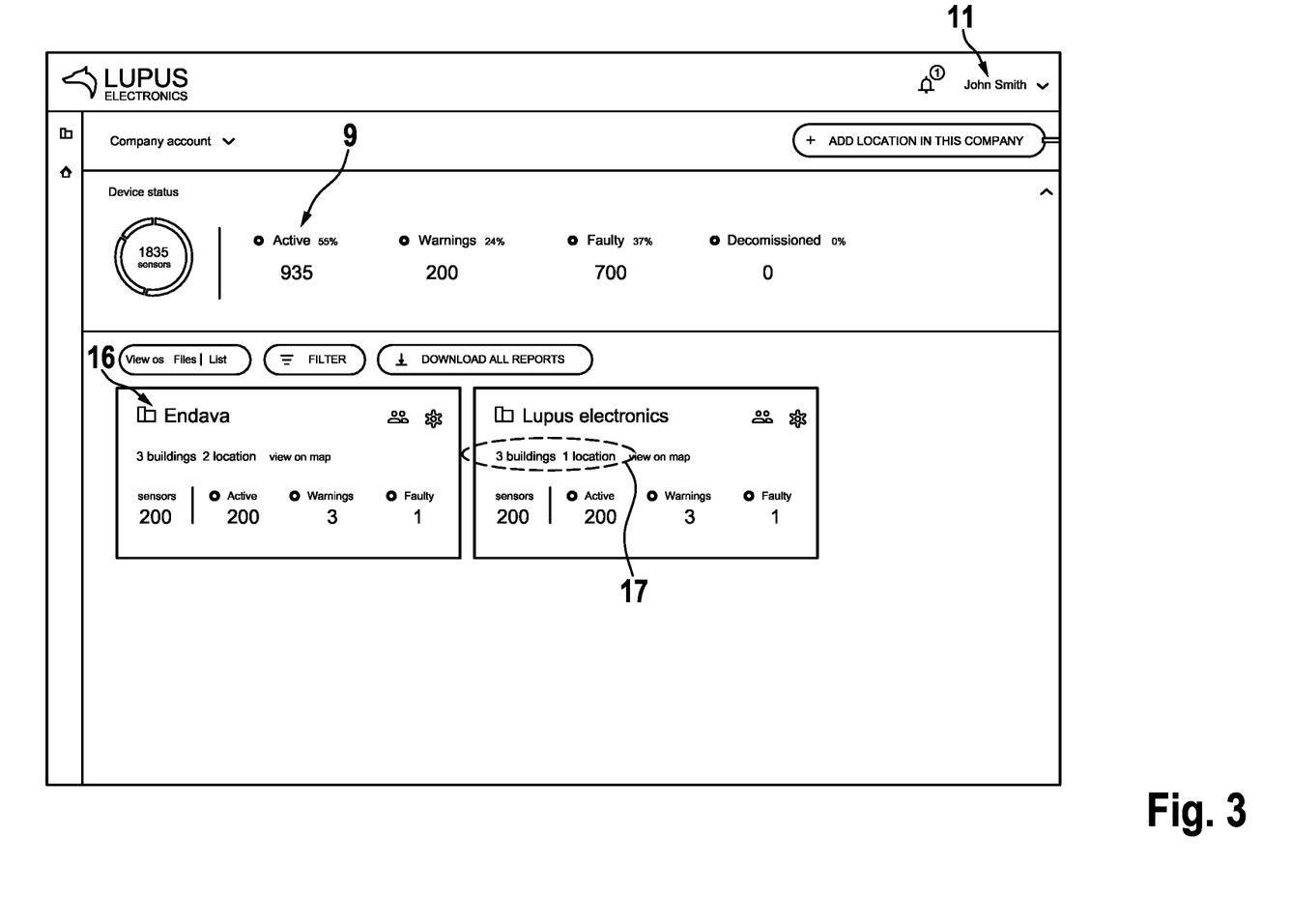
FIG. 3 an embodiment of a GUI showing a user profile.
Figure 4:
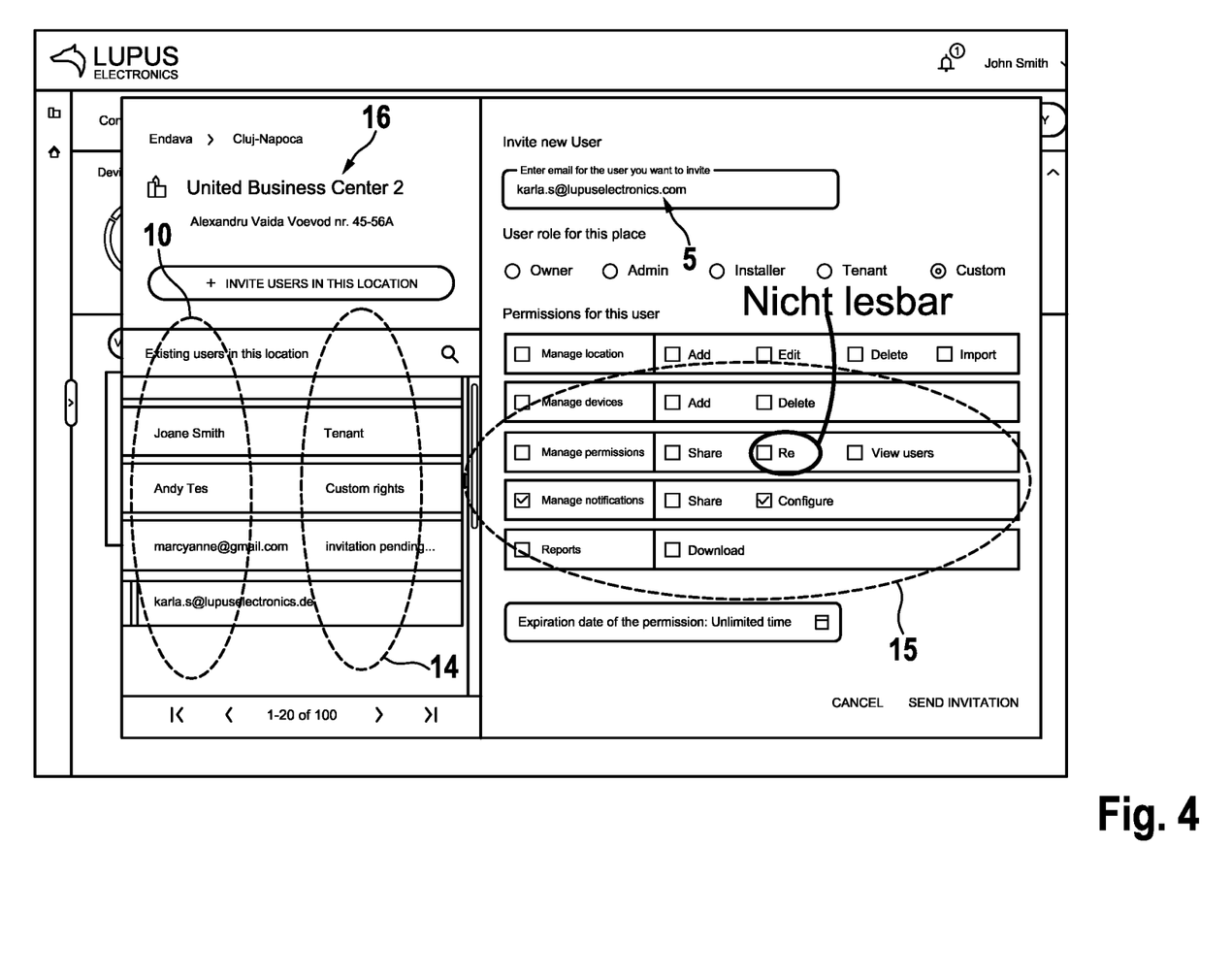
FIG. 4 an embodiment of a GUI showing a distribution of rights of different user profiles assigned to a user profile group.

Preferably, the user can access his user profile 11 via a computer device, for example, mobile device 4 and/or stationary device 13, using a computer program, app or GUI. FIGS. 3 to 6 show an example of a suitable GUI. The GUI allows the user to add, remove and/or manage smoke detectors and to view smoke detector data that has been transmitted. FIG. 3 shows, for example, an overview of the smoke detectors 8 assigned to a user profile 11. The status data 9 of the smoke detectors 8 assigned to user profile 11 can be seen directly at a glance. As shown in FIG. 3, the respective smoke detectors 8 can be divided into any smoke detector groups 16, for example, to facilitate administration. The respective smoke detector groups 16 can also be divided into any smoke detector subgroups 17. This can result in any group hierarchy of the assigned smoke detectors 8. The administration of smoke detector 8 can thus be made considerably easier by a suitable group hierarchy. It is not necessary to divide all smoke detectors 8 into smoke detector groups 16; in the example shown in FIG. 3, for example, 404 smoke detectors out of 1835 smoke detectors are divided into a first smoke detector group 16 ("Endava") with three smoke detector subgroups 17 ("3 buildings") and a further 404 smoke detectors into a second smoke detector group ("Lupus Electronics"') also with three smoke detector subgroups ("3 buildings"). The smoke detectors 8, the smoke detector groups 16 and/or smoke detector subgroups 17 can be assigned further attributes, e.g. a descriptive text or position and/or address data. In the exemplary design shown in the figures, the smoke detector subgroups 17 are determined by the address data 17 of the smoke detectors. In the design example shown, a smoke detector subgroup 17 thus includes all smoke detectors 8 installed in the same building. Of course, smoke detectors 8 can also be or become divided into more or less smoke detector groups or smoke detector subgroups; for example, all smoke detectors 8 installed on one floor of a building could be or become divided into a further subgroup. Such a division allows smoke detectors to be conveniently and flexibly divided into meaningful groups. A division of the smoke detectors into fewer smoke detector groups or smoke detector subgroups can also be carried out additionally or instead on the basis of other criteria. It can be provided for, for example, to also group the smoke detectors exclusively or additionally according to, for example, the type designation or according to manufacturer, in order to facilitate administration, for example, or, for example, in the case of maintenance messages, to send these to companies specializing exclusively in the respective manufacturer or smoke detector type. It can be advantageous to make the data transmitted by the smoke detector 8 available to other users or other user profiles 11. For this purpose, at least one or every smoke detector 8, smoke detector group 16 and/or smoke detector subgroup 17 can be assigned to or correspond to a user profile group 10. The respective user profile group 10 corresponds to the group of those user profiles 11 which can access some or all data of the smoke detector 8 assigned to the respective smoke detector 8 and/or smoke detector group 16 and/or smoke detector subgroup 17. As shown in FIG. 4, a group administrator can add or remove user profiles 11 to user profile group 10. Adding can be done particularly easily by using the user identification data 5 corresponding to a user profile 11. The administrator can individually grant or withdraw access rights 15 to each User Profile 11 in User Profile Group 10. This allows the administrator to control which user profile 11 can access which data of which smoke detector 8 and/or which notifications are sent to the respective user profile 11. As shown in FIG. 4, the user profiles 11 of user profile group 10 can also be divided into different sub-groups 14; in the example in FIG. 4 the roles 'Owner'; 'Admin', 'Installer', 'Tenant' or 'Custom'. Each role can have different rights; the respective roles "Owner"; "Admin", "Installer", "Tenant" can be templates or their rights can be predefined, allowing the administrator to manage rights quickly and conveniently. For example, a user profile 11 with the role "Tenant" can be configured to receive only notifications, e.g. in the event of an alarm, while another user profile 11 with the role "Installer" can also change the operating parameters of smoke detector 8. Unless otherwise provided, the user profile 11 can be the administrator who added the first smoke detector 8 to smoke detector group 16 using the method according to the invention.

Figure 5:
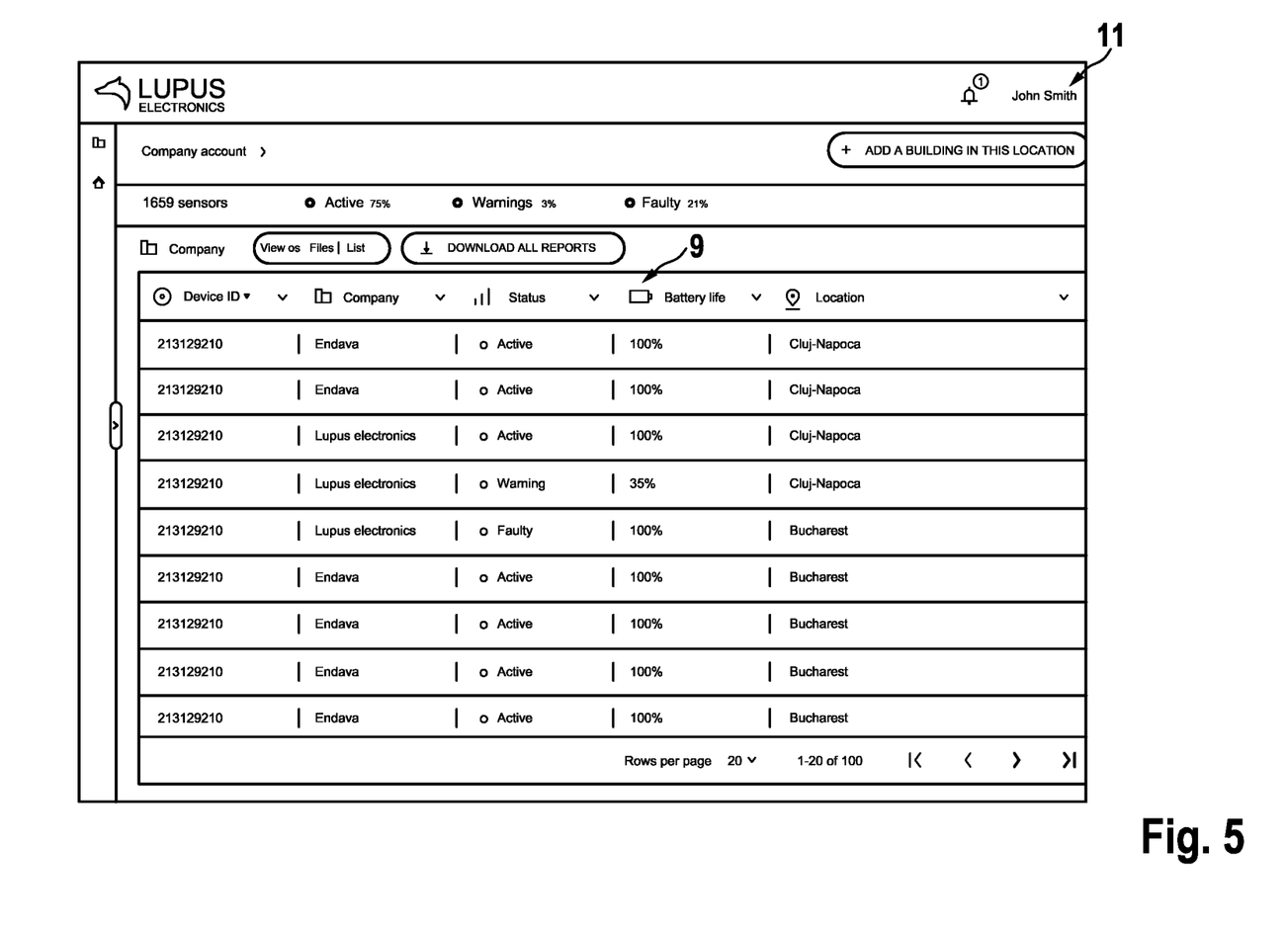
FIG. 5 an embodiment of a GUI showing an overview of smoke detectors associated with a user profile.

FIG. 5 shows another exemplary overview of the smoke detectors assigned to smoke detector group 16. This enables User Profile 11 to view the battery status of the respective smoke detectors or their status, for example.

Figure 6:
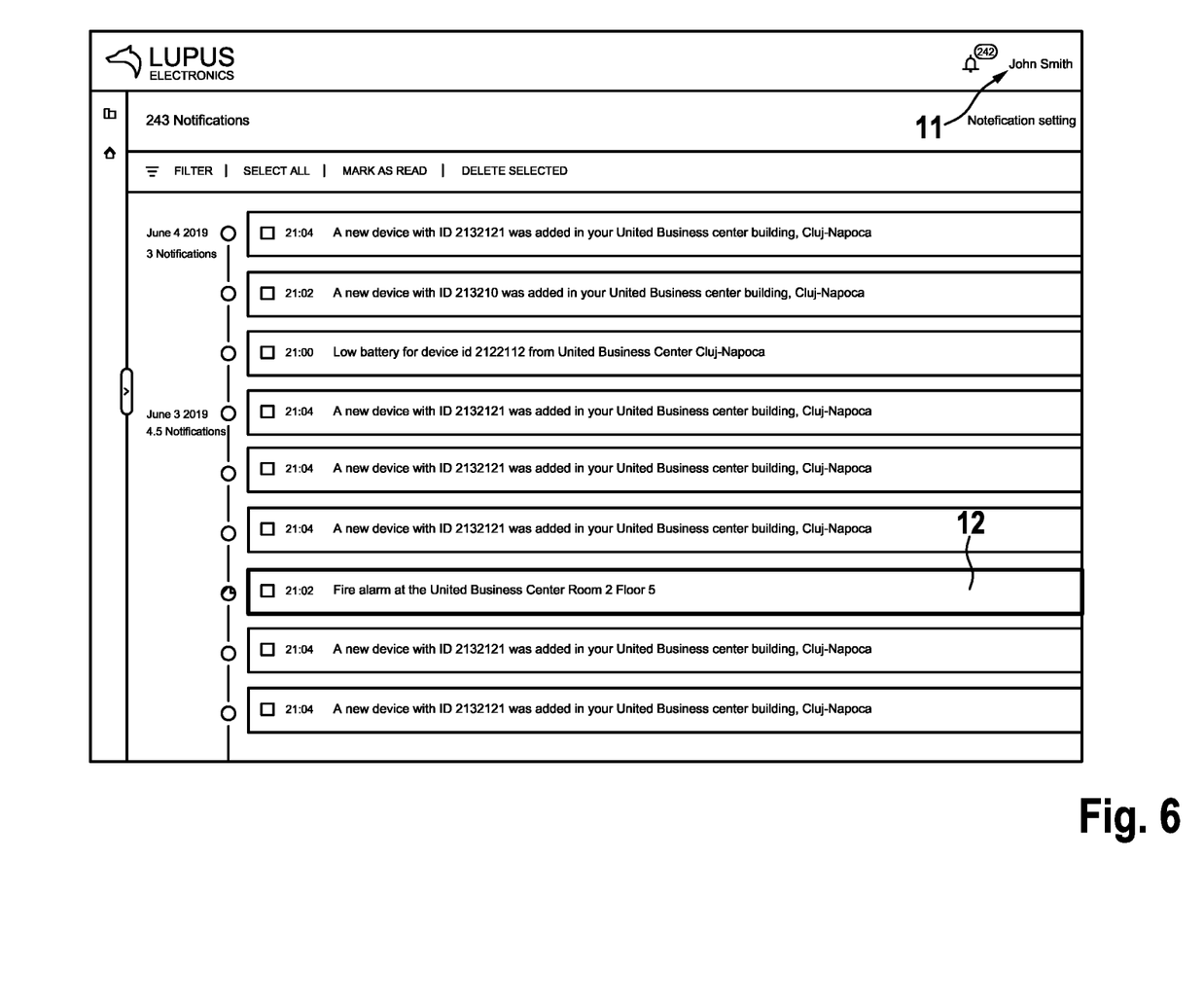
FIG. 6 an embodiment of a GUI showing messages communicated to a user profile, in particular an alarm message in case of an alarm.

FIG. 6 shows an example of notifications sent to User Profile 11. In the event of an alarm, an alarm message 12 can be sent to the user profiles 11 assigned to the smoke detector 8 reporting the alarm, or to the user profiles 11 of the assigned user profile group 10, which are equipped with the respective rights. Notifications can also be as shown in FIG. 6, e.g. installation or maintenance events or warnings regarding changes in smoke detector status, e.g. sensor failure or battery life. It may be intended that the notifications are sent to computer devices assigned to the respective user profile, such as mobile devices 4 and/or stationary devices 13, e-mail addresses, and telephone numbers or the like.

The features disclosed in the above description, in the drawings as well as in the claims may be essential for the realization of the invention either individually or in any combination.

The invention claimed is:

1. A method for assigning a smoke detector to be registered to a user profile of a smoke detector management system, comprising:
   establishing a data connection between the smoke detector and a server of the smoke detector management system and transmitting first identification data of the smoke detector to be registered to the server;
   establishing a data connection between a mobile device and the server;
   logging into the user profile by means of the mobile device using user identification data uniquely assigned to the user profile;
   transmitting second identification data of the smoke detector to be registered to the mobile device;
   transmitting the second identification data and/or the user identification data to the server by the mobile device; and
   identifying the smoke detector by means of the first and/or second identification data and assigning the smoke detector to the logged in user profile or the user profile corresponding to the user identification data.

2. The method according to claim 1, wherein after identifying the smoke detector and assigning the smoke detector to the user profile, position and/or address data are assigned to the smoke detector assigned to the user profile.

3. The method according to claim 1, in which the first and the second identification data are identical.

4. The method according to claim 1, in which the smoke detector and/or the mobile device is connected to the server wirelessly at least for the transmission of the respective data.

5. The method according to claim 1, in which the smoke detector, when establishing the connection to the server, either is directly connected to the server, or in which the smoke detector is connected to the server via the mobile device.

6. The method according to claim 1, in which the transmission of the second identification data to the mobile device either comprises detecting of a QR code attached to the smoke detector with the mobile device, or comprises detecting a pictogram or alphanumeric code attached to the smoke detector or enclosed with the smoke detector with the mobile device and using image recognition software, or is carried out via a wireless connection between the smoke detector and the mobile device.

7. The method according to claim 1, in which an authorization request is sent from the server to the mobile device before the smoke detector is assigned.

8. The method according to claim 1, in which, after the smoke detector has been assigned to a user profile, the smoke detector is assigned to at least one further user profile.

9. The method according to claim 1, in which, after the allocation, the smoke detector periodically transmits status data and/or operating data and/or the first identification data and/or the second identification data to the server.

10. The method according to claim 1, in which, after the allocation, the smoke detector once or periodically compares operating parameters, settings and/or firmware with the server and/or synchronises them with the server.

11. A smoke detector management system, comprising:

at least one smoke detector and at least one server, wherein at least one user profile is stored on the server, wherein the server is connected to the at least one smoke detector for data exchange, wherein the server is cloud-based, the server being set up to store data received from the smoke detector and to make it accessible to a user profile assigned to the smoke detector, the smoke detector being assigned to the user profile according to the method according to claim 1.

12. The smoke detector management system according to claim 11, in which the smoke detector is connected to the server wirelessly.

13. The smoke detector management system according to claim 11, wherein the server is connected to at least one computer device for data exchange, wherein the computer device is adapted to download, manipulate or to add new data to the user profile using user identification data uniquely identifying the user profile, the data being received from the corresponding smoke detector and stored on the server.

14. The smoke detector management system according to claim 11, wherein a plurality of user profiles are stored on the server, wherein at least one of the user profiles is assigned to at least one of at least two user profile groups, wherein each user profile assigned to the same user profile group is assigned to the same of the at least one smoke detector.

15. The smoke detector management system according to claim 14, wherein at least one of the user profiles assigned to a user profile group has administrator rights at least with respect to the respective user profile group.

16. The smoke detector management system according to claim 11, wherein the smoke detector management system comprises an evaluation unit which can identify an alarm case and/or maintenance case from the data received from the smoke detector, wherein in the alarm case the system sends an alarm message and/or in the maintenance case a maintenance message to the user profiles assigned to the smoke detector.

* * * * *